(12) United States Patent
Tang et al.

(10) Patent No.: US 8,572,165 B2
(45) Date of Patent: Oct. 29, 2013

(54) COLLABORATIVE FILTERING OF CONTENT

(75) Inventors: Jeffrey Tang, San Diego, CA (US); Aran Sadja, San Diego, CA (US)

(73) Assignee: Sony Corporation, Tokyo (JP)

( * ) Notice: Subject to any disclaimer, the term of this patent is extended or adjusted under 35 U.S.C. 154(b) by 187 days.

(21) Appl. No.: 13/179,371

(22) Filed: Jul. 8, 2011

(65) Prior Publication Data

US 2013/0013681 A1 Jan. 10, 2013

(51) Int. Cl.
*G06F 15/16* (2006.01)
(52) U.S. Cl.
USPC .......................................... 709/203; 709/219
(58) Field of Classification Search
USPC .......... 705/26.7; 707/722–723; 709/203–207, 709/217–219; 725/39–40
See application file for complete search history.

(56) References Cited

U.S. PATENT DOCUMENTS

| | | | |
|---|---|---|---|
| 6,742,033 B1* | 5/2004 | Smith et al. ................ | 709/224 |
| 7,669,123 B2* | 2/2010 | Zuckerberg et al. ......... | 715/273 |
| 7,761,399 B2* | 7/2010 | Evans ........................... | 706/55 |
| 8,051,074 B2* | 11/2011 | Eom et al. .................... | 707/722 |
| 8,150,842 B2* | 4/2012 | Brougher et al. ............. | 707/723 |
| 2005/0055426 A1* | 3/2005 | Smith et al. ................. | 709/219 |
| 2005/0245245 A1* | 11/2005 | Sorvari et al. ................ | 455/418 |
| 2006/0271997 A1 | 11/2006 | Jacoby et al. | |
| 2007/0027706 A1* | 2/2007 | Murray et al. ................ | 705/1 |
| 2007/0204308 A1* | 8/2007 | Nicholas et al. ............. | 725/86 |
| 2007/0288416 A1* | 12/2007 | Ferguson et al. ............ | 706/50 |
| 2008/0092182 A1* | 4/2008 | Conant ......................... | 725/109 |
| 2008/0163380 A1* | 7/2008 | Liu ................................ | 726/28 |
| 2009/0112989 A1* | 4/2009 | Anderson et al. ............ | 709/204 |
| 2009/0293079 A1 | 11/2009 | McKee et al. | |
| 2009/0300502 A1 | 12/2009 | Johnson et al. | |
| 2010/0242074 A1* | 9/2010 | Rouse et al. .................. | 725/100 |
| 2010/0287033 A1* | 11/2010 | Mathur ......................... | 705/10 |
| 2011/0082747 A1* | 4/2011 | Khan et al. ................... | 705/14.58 |
| 2011/0107382 A1* | 5/2011 | Morris et al. ................. | 725/109 |
| 2011/0213703 A1* | 9/2011 | Nagarajan et al. ........... | 705/42 |
| 2011/0282734 A1* | 11/2011 | Zurada .......................... | 705/14.49 |
| 2012/0030586 A1* | 2/2012 | Ketkar ........................... | 715/751 |
| 2012/0095958 A1* | 4/2012 | Pereira et al. ................ | 707/609 |
| 2012/0144311 A1* | 6/2012 | Yeh et al. ...................... | 715/744 |
| 2012/0151383 A1* | 6/2012 | Kazan et al. .................. | 715/753 |
| 2012/0284343 A1* | 11/2012 | Lee et al. ...................... | 709/206 |
| 2012/0331496 A1* | 12/2012 | Copertino et al. ............ | 725/14 |
| 2013/0035086 A1* | 2/2013 | Chardon et al. .............. | 455/420 |

OTHER PUBLICATIONS

Rosario et al.; "Television meets Facebook : social networking through consumer electronics", Massachusetts Institute of Technology 2008; http://dspace.mit.edu/handle/1721.1/46578.

\* cited by examiner

*Primary Examiner* — Brendan Higa
(74) *Attorney, Agent, or Firm* — Trellis IP Law Group, PC

(57) ABSTRACT

Embodiments generally relate to aggregating mentions. In one embodiment, a method includes retrieving a plurality of mentions from a social networking service, where each mention is associated with one or more users of the social networking service. The method also includes aggregating the mentions, and displaying the mentions based on one or more formats.

17 Claims, 8 Drawing Sheets

COLLABORATIVE FILTERING OF CONTENT

BACKGROUND

Social networks enable communities of people to interact socially online. Social media networks use highly accessible and scalable communication techniques, including the use of web-based and mobile technologies. Social networking sites allow users to share ideas, activities, events, and interests within their individual networks. A social networking service is an online service, platform, or site that facilitates the building of social networks. Examples of social networking service providers include Facebook, Twitter, Orkut, Bebo, Myspace, Hi5, Flickr, etc.

In addition to sharing user profiles, users of social networks may share interests and/or activities. For example, on Facebook, users may post "likes" for different content such as websites, comments, etc. A user typically logs onto the social network site. If the user comes across a content item such as a webpage or comment, etc., that the user likes, the user may click on a "like" button to let other users know that the user likes the content item. To view a given users likes, one would typically log onto a social network site, go to the profile page of the given user, and view the activity list of the given user. The given user's activity list may include likes, among other user actions.

SUMMARY

Embodiments generally relate to aggregating mentions. In one embodiment, a method includes retrieving a plurality of mentions from a social networking service, where each mention is associated with one or more users of the social networking service. The method also includes aggregating the mentions, and displaying the mentions based on one or more formats.

A further understanding of the nature and the advantages of particular embodiments disclosed herein may be realized by reference of the remaining portions of the specification and the attached drawings.

DETAILED DESCRIPTION

Embodiments described herein provide users with aggregated peer information (e.g., likes, recommendations, etc.) associated with particular content (e.g., videos, TV shows, movies, songs, books, etc.). For example, in one embodiment, a system retrieves such peer information, also referred to herein as "mentions," where each mention indicates a user's level of interests in, affinity for, or aversion to particular content (e.g., friend A likes video A, friend B recommends movie B, friend C likes song C, etc.). The system then aggregates the mentions.

In one embodiment, the system may display the mentions to a particular user based on one or more formats. For example, the system may display the mentions on the same screen as the content that the particular user is viewing. The system may also display different mentions next to content labels in an electronic programming guide (EPG). The system may also display the mentions based on popularity, based on user names, or based on the particular user. Particular embodiments are described in more detail below.

Figure 1:
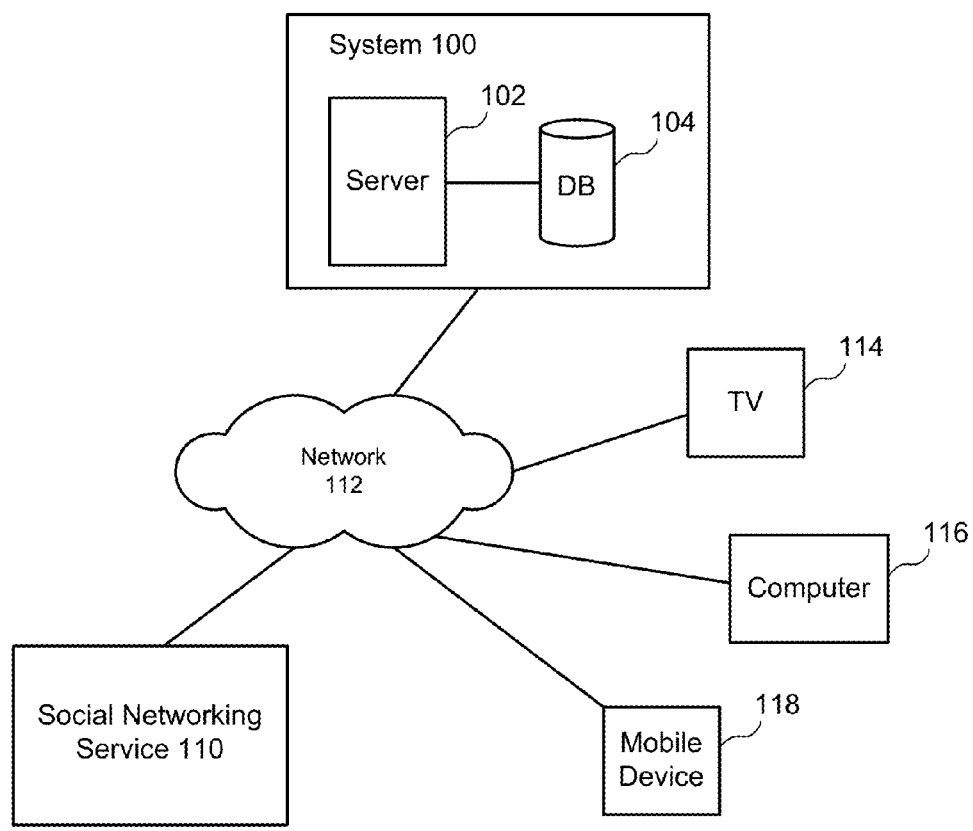
FIG. 1 illustrates a block diagram of an example environment, which may be used to implement the embodiments described herein.

FIG. 1 illustrates a block diagram of an example environment, which may be used to implement the embodiments described herein. In one embodiment, a system 100 includes a server 102 and a database 104. System 100 may connect to a social networking service 110 via a network 112, such as the Internet. User devices such as a television (TV) 114, computer 116, mobile device 118, etc. may connect to system 100 and social networking service 110 via network 112.

For ease of illustration, FIG. 1 shows one block for each of TV 114, computer 116, and mobile device 118. These blocks 114, 116, and 118 may represent multiple TVs, computers, and mobile devices. Also, user devices may also include eReaders and other devices. In one embodiment, TV 114 may be an Internet TV, also referred to as an Internet-enabled TV or an online TV. TV 114 may also be an Internet Protocol (IP) TV. In other embodiments, TV 114 may also be a Sony Bravia TV or a Sony Internet TV, for example.

As described in more detail below, system 100 retrieves mentions such as likes from social networking service 110. System 110 then aggregates the mentions and displays the mentions on a user device such as TV 114, computer 116, mobile device 118, etc.

Figure 2:
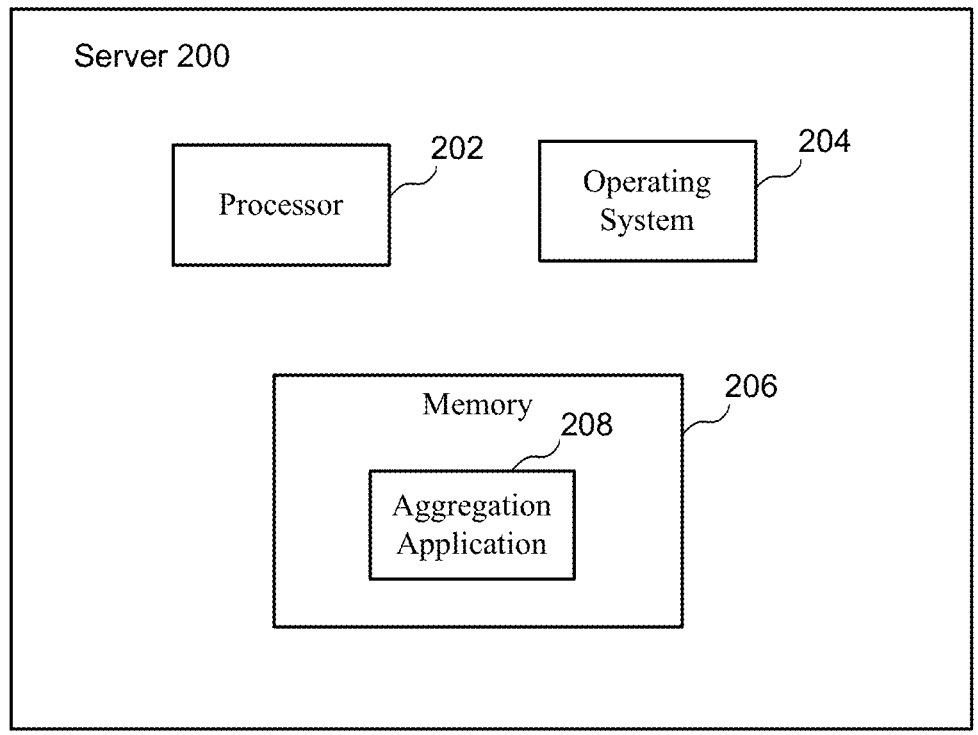
FIG. 2 illustrates a block diagram of an example computer system, which may be used to implement the embodiments described herein.

FIG. 2 illustrates a block diagram of an example computer system, which may be used to implement the embodiments described herein. In one embodiment, the computer system may include a server 200, which may be used to implement server 100 of FIG. 1. In one embodiment, server 200 includes a processor 202, an operating system 204, a memory 206, and an application 208. For ease of illustration, only these blocks are shown, server 200 is not limited to these blocks and may include other components, depending on the particular implementation. Application 208 is stored on memory 206 or on any other suitable storage location or computer-readable medium. Application 208 provides instructions that enable processor 202 to perform the functions described herein.

Figure 3:
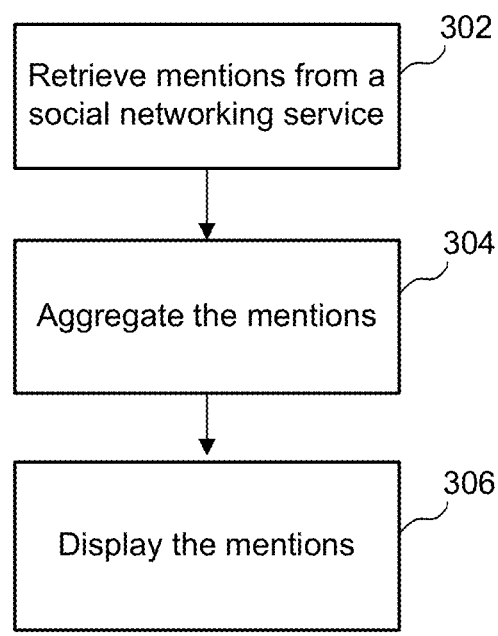
FIG. 3 illustrates an example simplified flow diagram for providing mentions to a user, according to one embodiment.

FIG. 3 illustrates an example simplified flow diagram for providing mentions to a user, according to one embodiment. Referring to both FIGS. 1 and 3, a method is initiated in block 302, where system 100 pulls or retrieves mentions from social networking service 110. In one embodiment, each mention is associated with one or more users of social networking service 110. In one embodiment, a mention associates a user level of interest in, affinity for, or aversion to a particular content item. For example, a mention may be an indication of a like, a dislike, a follow, a recommendation, etc. Mentions are not limited to these specific examples. Examples of such a content item may include, but is not limited to, a video, a TV program, a movie, a song, a photo, a blog, a news article, an e-book, etc.

A mention may be generated at the social networking site when a user logs on to the site, sees a content item such as a video, TV program, etc., and clicks on a button (e.g., indicating a "Like"). In one embodiment, a given mention may be associated with metadata such as a tag or hash tag that indicates whether the mention is a like, a dislike, a follow, an interest, a recommendation, etc. Social networking service 110 stores the mentions in an appropriate memory location.

In one embodiment, system 100 may retrieve mentions from social networking service 110 at various times. For example, in one embodiment, system 100 may retrieve mentions for a user when the user logs on to social networking service 110. In one embodiment, system 100 may retrieve mentions at any time using an authorization token established by the user. In one embodiment, the authorization token may expire after a predefined time period. In one embodiment, the user may configure the authorization token to never expire. As along as the authorization token remains valid, system 100 may perform this step at any time.

In one embodiment, system 100 functions as an intermediate application programming interface (API) between user devices (e.g., TV 114, computer 116, mobile device 118, etc.) and the API of social networking service 110. In one embodiment, system 100 manages API information including updating APIs, adding new APIs, etc.

In block 304, system 100 aggregates the mentions. In one embodiment, the system may store the aggregated mentions in database 104, or in any other appropriate location.

In block 306, system 100 displays the mentions based on one or more formats. In one embodiment, system 100 may display a number of mentions for a particular content item. As described in more detail below with respect to FIGS. 4-8, system 100 may display the mentions in a variety of user interfaces (UIs) having varying formats.

Figure 4:
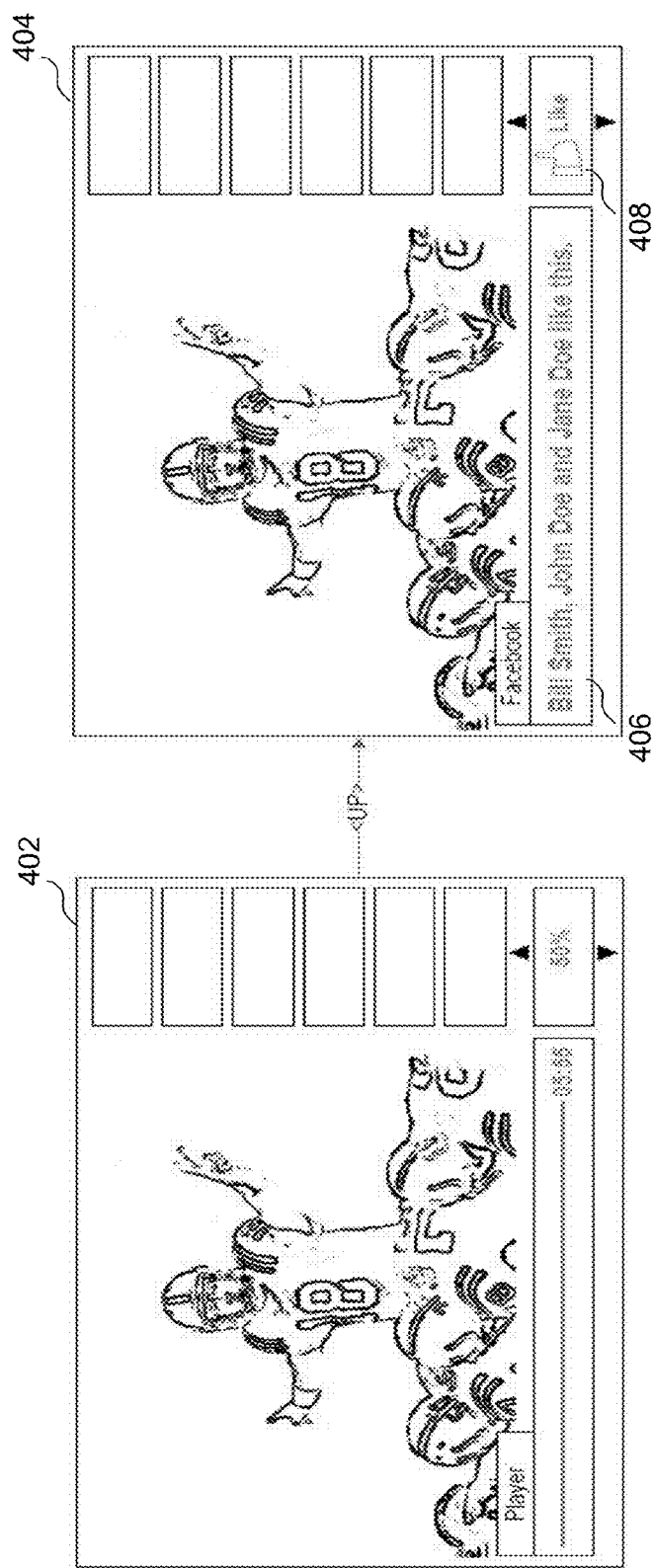
FIG. 4 illustrates example screen shots of a video, according to one embodiment.

FIG. 4 illustrates example screen shots 402 and 404 of a video, according to one embodiment. In one embodiment, screen shots 402 and 404 may be of videos displayed on an Internet TV or computer, etc. Screen shot 402 shows a first mode where the elapsed time is displayed across the bottom. Screen shot 404 shows a second mode where the names 406 of other users who like the video are displayed across the bottom.

Screen shot 404 shows one way that system 100 may display aggregated mentions. This particular UI enables the user to not only see which other users like the video, but the UI also to enables the user to indicate that the user likes the video. For example, if the user currently viewing the video also likes it, the user may select the like button 408. This would add the user to list of users who like the video. In one embodiment, system 100 may push or send the mention (e.g., new like) to social networking service 100 for appropriate updating at the social network service 100. While this particular example involves a video, embodiments described may apply to other types of content (e.g., books, songs, etc.). In one embodiment, system 100 may also show a mention count (e.g., how many friends like the particular content item).

Figure 5:
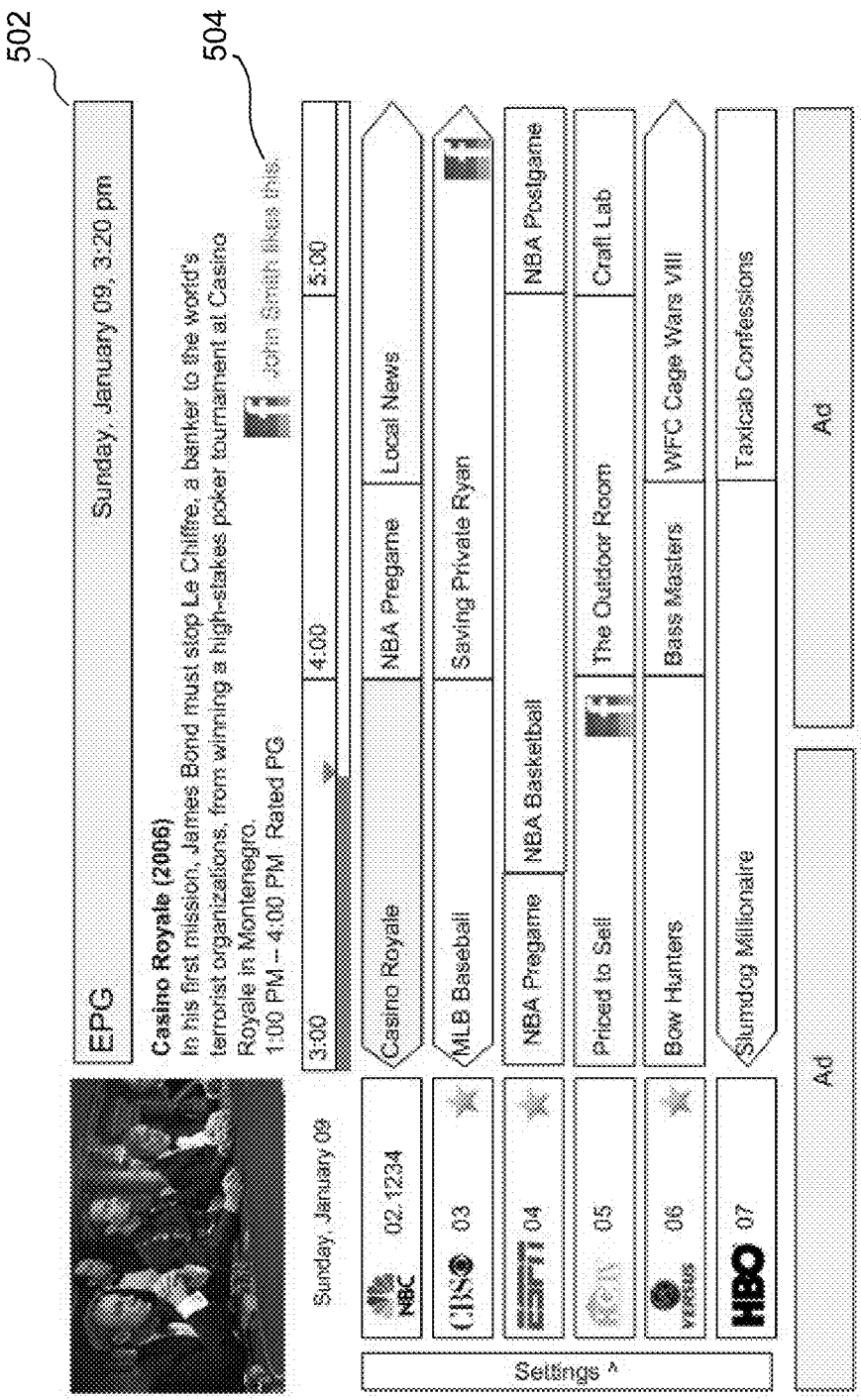
FIG. 5 illustrates an example screen shot of an electronic programming guide, according to one embodiment.

FIG. 5 illustrates an example screen shot 502 of an electronic programming guide (EPG), according to one embodiment. As FIG. 5 shows, mentions (e.g., likes) are integrated into the EPG. For example, the EPG displays a program (e.g., movie called "Casino Royale") and a mention 504 (e.g., "John Smith likes this"). The particular mention or label for the mention will depend on the particular implementation. For example, the same mention may state that "John Smith recommends this," if the mention were a recommendation. In one embodiment, system 100 may also show a mention count (e.g., how many friends like the particular content item).

Figure 6:
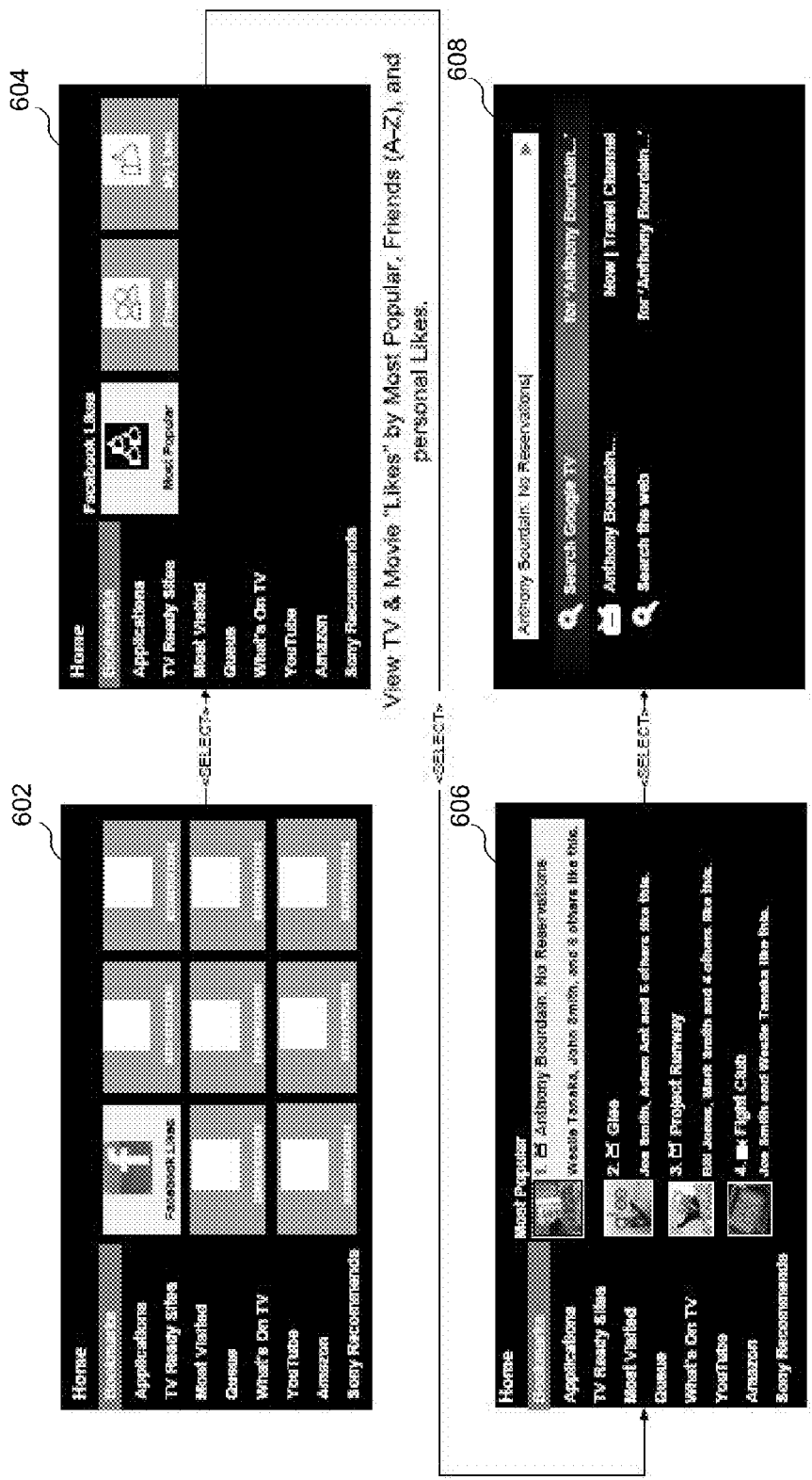
FIG. 6 illustrates example screen shots, where a system displays mentions based on popularity, according to one embodiment.

FIG. 6 illustrates example screen shots 602, 604, 606, and 608, where system 100 displays mentions based on popularity, according to one embodiment. Screen shot 602 shows bookmarks with a mentions selection (e.g., "Facebook likes"). If the mentions selection is selected, screen shot 604 shows ways the mentions may be displayed (e.g., based on popularity, based on user names, or based on a particular user). This particular example assumes that the user has selected to display the mentions based on popularity. As such, screen shot 604 shows a highlighted popularity selection (e.g., "Most Popular"). If the popularity selection is selected, screen shot 606 displays mentions based on popularity of the content. In one embodiment, the content is listed in the order of popularity. As screen shot 606 shows, each content item is displayed with the other users who like the content item.

In one embodiment, a user may initiate a search for a particular content item by selecting the content item. Screen shot 608 shows search options. For example, system 100 may perform a search such as a Google search or other suitable search, etc. The user may then select a search option to initiate the search.

Figure 7:
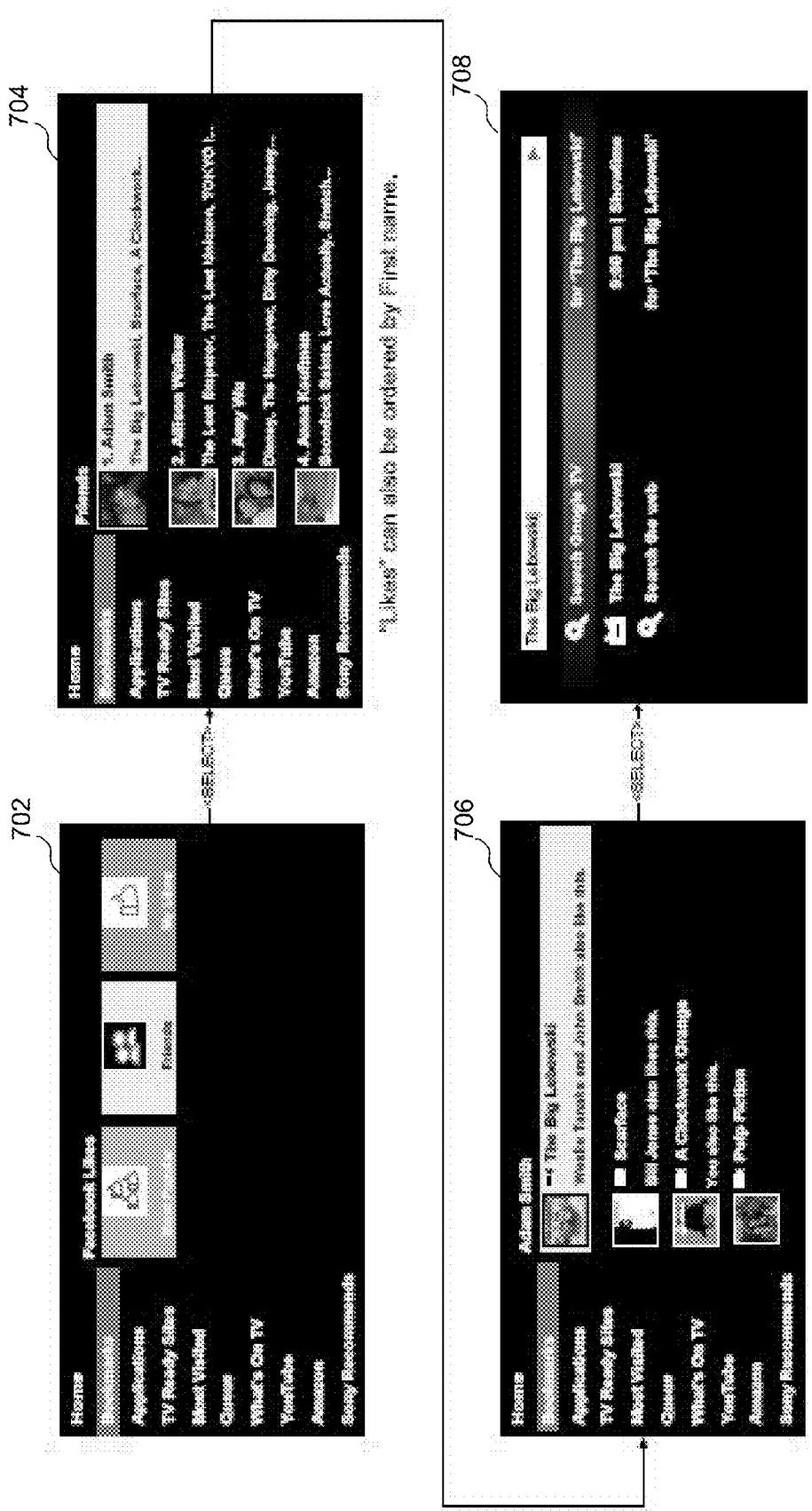
FIG. 7 illustrates example screen shots, where a system displays mentions based on user names, according to one embodiment.

FIG. 7 illustrates example screen shots 702, 704, 706, and 708, where system 100 displays mentions based on user names, according to one embodiment. This particular example assumes that the user has selected to display the mentions based on user names. As such, screen shot 702 shows a highlighted user name selection (e.g., "Friends"). If the user name selection is selected, screen shot 704 displays a list of user names. In one embodiment, the user names are listed in alphabetical order by first name. In another embodiment, the user names may be listed in alphabetical order by last name. As screen shot 704 shows, each user name is displayed with the mentions associated with that particular user.

The user may then select a user name (e.g., "Adam Smith"). If a user name is selected, screen shot 706 shows a list of content items that the selected user likes. As screen shot 706 shows, each content item is displayed with the other users who also like the particular content item. In one embodiment, a user may initiate a search for a particular content item by selecting the content item. Screen shot 708 shows search options. For example, system 100 may perform a search such as a Google search or other suitable search, etc. The user may then select a search option to initiate the search.

Figure 8:
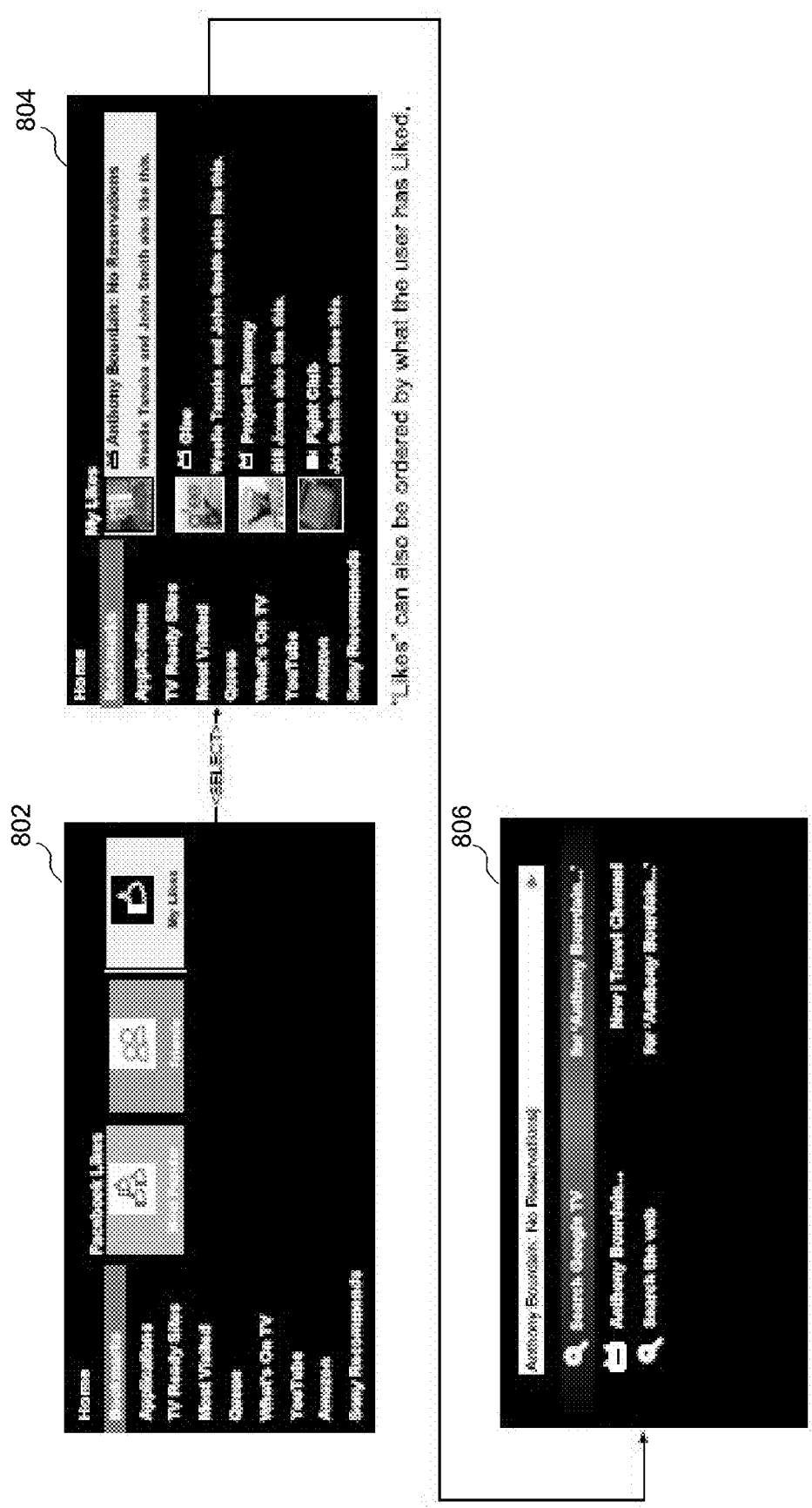
FIG. 8 illustrates example screen shots, where a system displays mentions based on a particular user, according to one embodiment.

FIG. 8 illustrates example screen shots 802, 804, 806, and 808, where system 100 displays mentions based on a particular user, according to one embodiment. This particular example assumes that the user has selected to display the mentions associated with the user. As such, screen shot 802 shows a highlighted user selection (e.g., "My likes"). If the user selection is selected, screen shot 704 displays a list of content items that the user likes. As screen shot 704 shows, each content item is displayed with the other users who like the particular content.

The user may then select a user name (e.g., "Adam Smith"). If a user name is selected, screen shot 706 shows a list of content items that the selected user likes.

In one embodiment, a user may initiate a search for a particular content item by selecting the content item. Screen shot 708 shows search options. For example, system 100 may perform a search such as a Google search or other suitable search, etc. The user may then select a search option to initiate the search.

In one embodiment, system 100 may also show a mention count (e.g., how many friends like a particular content item) in the examples shown in FIGS. 6-8. With respect to FIGS. 6-8, in one embodiment, after searching for the particular content item (e.g., TV program), the user may perform various actions to the content, such as viewing, downloading, purchasing, etc.

Note that while in the example embodiments described in FIGS. 6-8, the user is able to select the format of displaying mentions (e.g., by popularity, user names, etc.), other embodiments are possible. For example, the particular format may be displayed by default without the user needing to select the format.

Although the description has been described with respect to particular embodiments thereof, these particular embodiments are merely illustrative, and not restrictive. For example, embodiments may be implemented mobile applications, such as in iPhone, iPad, Android applications, eReaders, iTunes, etc., where users may download recommended TV, movies, books, music, etc.

Any suitable programming language can be used to implement the routines of particular embodiments including C, C++, Java, assembly language, etc. Different programming techniques can be employed such as procedural or object-oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method comprising:
   retrieving a plurality of mentions indicating a user level of interest in a content item from a social networking service, wherein each mention is associated with one or more users of the social networking service;
   aggregating the mentions; and
   displaying the mentions to a user based on one or more formats;
   wherein the retrieving occurs prior to any selection of a content item by the user to whom the mentions are displayed; and
   wherein the retrieving occurs automatically either when the user logs on to the social networking service or at a time at which an authentication token established by the user is valid.

2. The method of claim 1, wherein each mention is one of a like indication, a dislike indication, a follow indication, and a recommendation.

3. The method of claim 1, wherein the content item is one or more of a video, a television program, a movie, a song, a photo, a blog, a news article, and an e-book.

4. The method of claim 1, wherein the mentions are displayed based on popularity of the content item.

5. The method of claim 1, wherein the mentions are displayed based on user names.

6. The method of claim 1, wherein the mentions are displayed based on a particular user.

7. The method of claim 1, wherein the mentions are integrated into an electronic programming guide.

8. Software encoded in one or more non-transitory computer-readable media for execution by the one or more processors and when executed operable to:
   retrieve a plurality of mentions indicating a user level of interest in a content item from a social networking service, wherein each mention is associated with one or more users of the social networking service;
   aggregate the mentions; and display the mentions to a user based on one or more formats;
wherein the retrieving occurs prior to any selection of a content item by the user to whom the mentions are displayed; and
wherein the retrieving occurs automatically either when the user logs on to the social networking service or at a time at which an authentication token established by the user is valid.

9. The software of claim 8, wherein each mention is one of a like indication, a dislike indication, a follow indication, and a recommendation.

10. The software of claim 8, wherein the content item is one or more of a video, a television program, a movie, a song, a photo, a blog, a news article, and an e-book.

11. The software of claim 8, wherein the mentions are displayed based on popularity of the content item.

12. The software of claim 8, wherein the mentions are displayed based on user names.

13. The software of claim 8, wherein the mentions are displayed based on a particular user.

14. The software of claim 8, wherein the mentions are integrated into an electronic programming guide.

15. An apparatus comprising:
one or more processors; and
logic encoded in one or more tangible media for execution by the one or more processors and when executed operable to:
retrieve a plurality of mentions indicating a user lever of interest in a content item from a social networking service, wherein each mention is associated with one or more users of the social networking service;
aggregate the mentions; and
display the mentions to a user based on one or more formats;
wherein the retrieving occurs prior to any selection of a content item by the user to whom the mentions are displayed; and
wherein the retrieving occurs automatically either when the user logs on to the social networking service or at a time at which an authentication token established by the user is valid.

16. The apparatus of claim 15, wherein each mention is one of a like indication, a dislike indication, a follow indication, and a recommendation.

17. The apparatus of claim 15, wherein the content item is one or more of a video, a television program, a movie, a song, a photo, a blog, a news article, and an e-book.

* * * * *